Sept. 30, 1924.  
E. H. GOLD ET AL  
HOSE COUPLING  
Filed May 1, 1922

Inventors  
Egbert H. Gold  
Edward A. Russell  
By Barnett & Truman  
Attorneys Sept. 30, 1924.

E. H. GOLD ET AL
HOSE COUPLING
Filed May 1, 1922

Inventors.
Egbert H. Gold
Edward A. Russell
By Barnett & Ullman
Attorneys

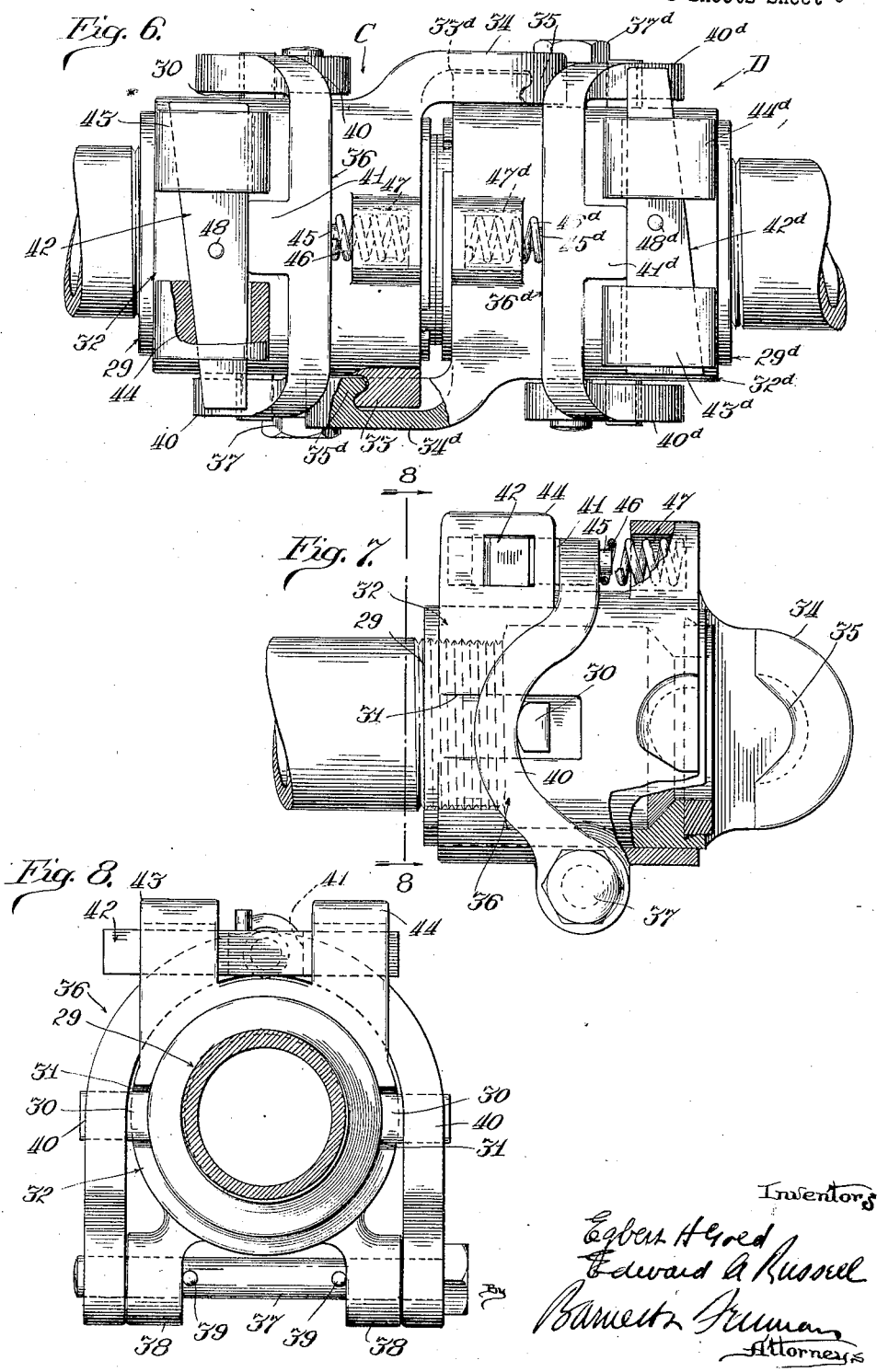

Patented Sept. 30, 1924.

1,510,000

UNITED STATES PATENT OFFICE.

EGBERT H. GOLD AND EDWARD A. RUSSELL, OF CHICAGO, ILLINOIS; SAID RUSSELL ASSIGNOR OF HIS INTEREST TO VAPOR CAR HEATING COMPANY, INC., OF CHICAGO, ILLINOIS, A CORPORATION OF NEW YORK.

HOSE COUPLING.

Application filed May 1, 1922. Serial No. 557,675.

*To all whom it may concern:*

Be it known that we, EGBERT H. GOLD and EDWARD A. RUSSELL, citizens of the United States, residing at Chicago, in the county of Cook and State of Illinois, have invented certain new and useful Improvements in Hose Couplings, of which the following is a specification.

Our invention relates to a hose coupling for connecting the rubber hoses, or equivalent flexible conduit members on the train pipes of the adjacent cars of a railway train or for use in connecting pipes or hoses in other similar situations; the invention being concerned particularly with the type of coupling in which one or each of the mating couplers comprises a conduit member, preferably provided with a gasket to bear against corresponding part of the mating coupler, a coupling member through which the conduit member extends adapted to interlock with the mating coupler, and means for effecting a relative movement between said conduit and coupling members which makes effectual the interlock of one coupler with the other and forces the conduit member into close contact with the conduit member of the other coupler.

The principal object of the invention is to provide a new and improved coupler of the type indicated which will be simple in its construction, economical to manufacture, of compact structure, and light in weight while providing effective means for insuring a reliable interlock between the coupler and its mate.

In describing the invention it will be assumed that both members of the coupling, that is, both couplers, are of the same construction. It will be obvious, however, that identity of structural design throughout is not essential so long as each coupler is so constructed as to mate with the other.

The invention is illustrated in two typical embodiments, in the accompanying drawings wherein—

Fig. 6 is a plan view, with parts in section, of a pair of interlocked couplers embodying a modified form of the invention.

Fig. 7 is a side elevation with one lower corner in section, of one of the couplers shown in Fig. 6, and Fig. 8 is a sectional view on line 8—8 of Fig. 7.

Figure 1:
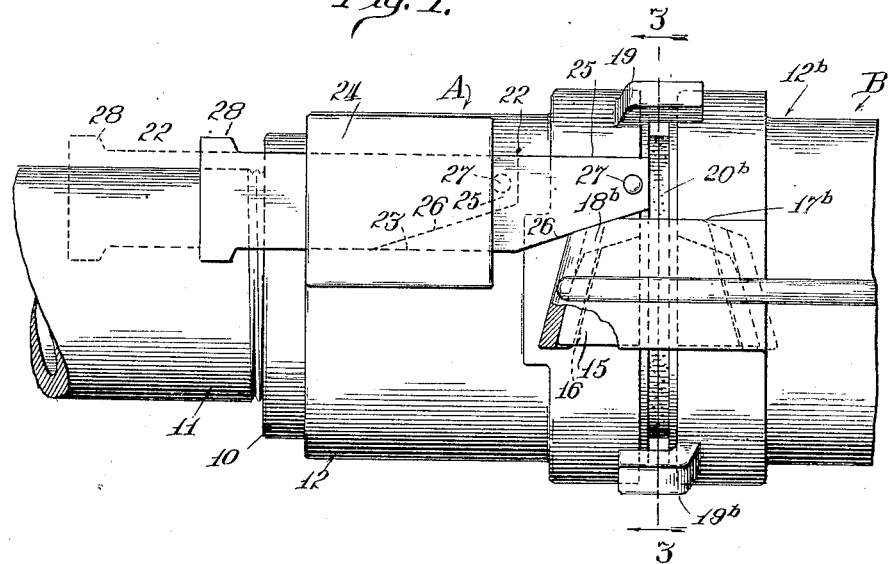
Fig. 1 is a side elevation of a coupler embodying the invention in one preferred form, the figure showing fragmentarily another coupler of like construction in mating relation with the coupler shown in full.
Figure 2:
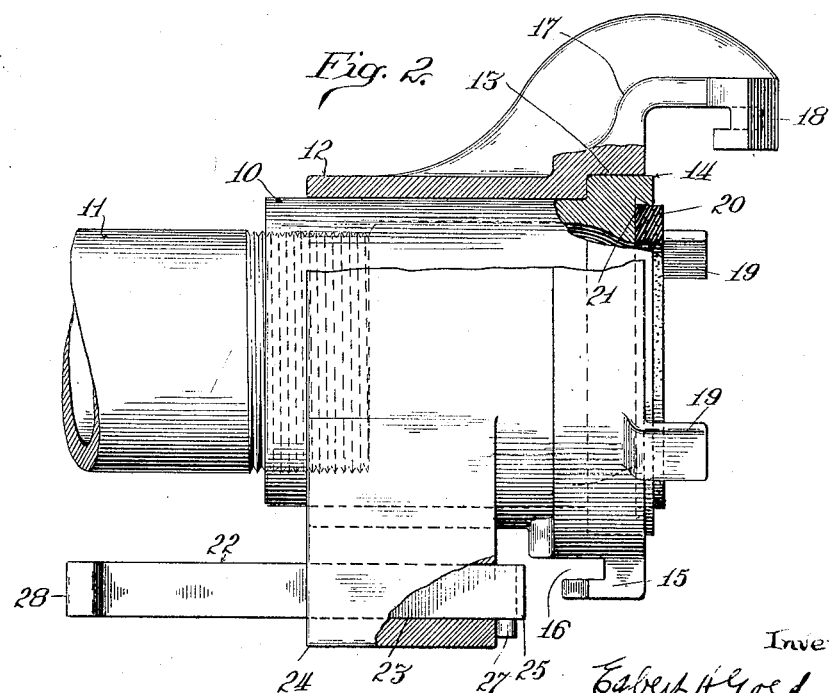
Fig. 2 is a plan view, with parts in section, of the coupler shown in Fig. 1.
Figure 3:
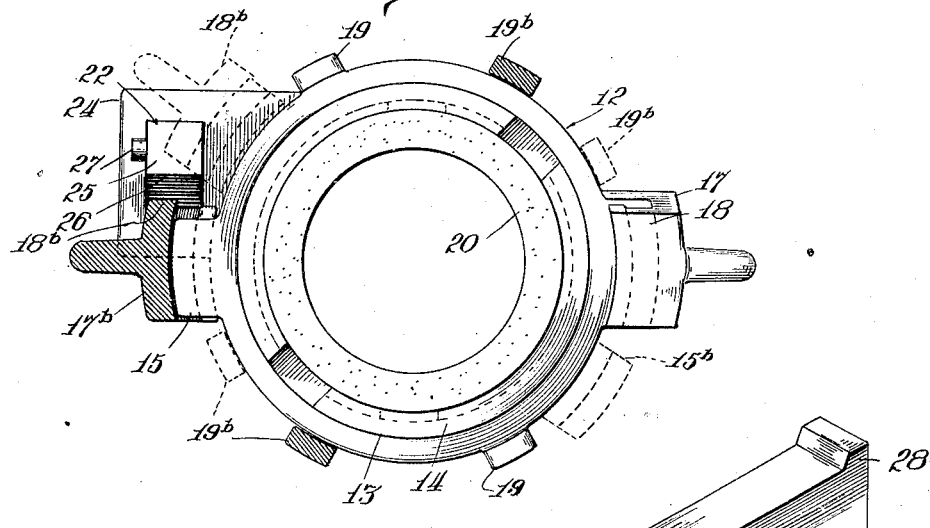
Fig. 3 is a sectional view on line 3—3 of Fig. 1.
Figure 5:
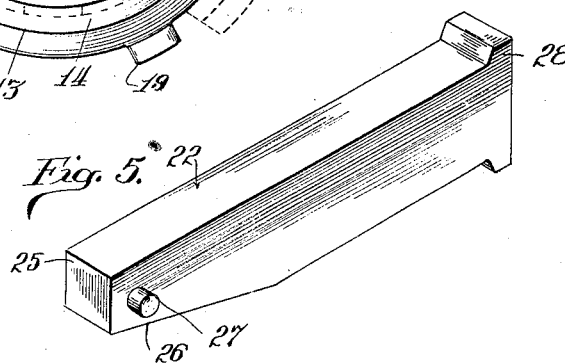
Fig. 5 is a similar view of the key or wedge for tightening and preserving the interlock between the coupler and the mating element of the coupling.
Figure 4:
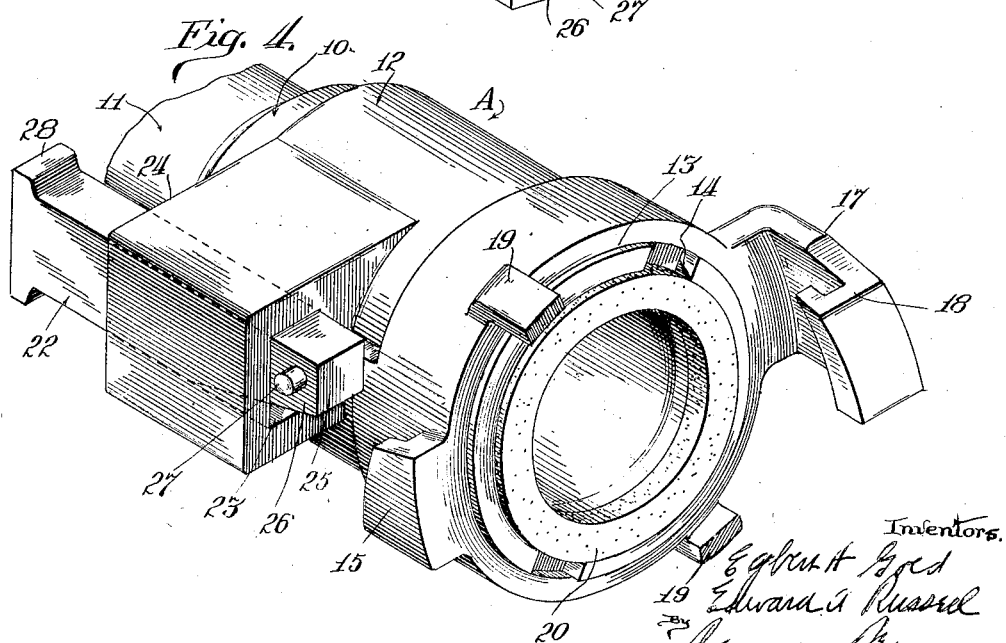
Fig. 4 is a view, in perspective, of the coupler.

Referring first to Figs. 1 to 5 inclusive, one of the couplers is indicated, as a whole, by the letter A and the other, shown fragmentarily in Figs. 1 and 3, by the letter B. 10 designates the conduit or gasket holding member of the coupler which is shown as provided with a nipple or union 11 for connection with a rubber hose or other tubular structure. 12 is the coupling member of coupler A which is hollow to receive the conduit member and is formed at its forward end with a recess 13 to receive the enlargement 14 on the end of said conduit member. The coupling member 12 is formed on one side with an outstanding lug 15 which has a wedging configuration, being wider at the bottom than the top and is formed with an undercut groove 16. The opposite side of the coupling member is provided with a forwardly extending wing or arm 17 formed with an undercut wedging lug 18 adapted to interlock with a lug $15^b$ on the coupling $12^b$ of coupler B which corresponds to the lug 15 just described. Coupler member $12^b$ is formed with a wing $17^b$, corresponding to the wing 17 of coupler A, which is formed with a wedging lug $18^b$ adapted to interlock with the lug 15.

Preferably the coupling members 12, $12^b$ are formed with pairs of diametrically arranged, forwardly extending centering lugs 19, $19^b$ to aid in aligning the couplers when brought together for coupling.

The coupling engagement is made by rotating one or both of the coupling members on their conduit members. The wedging configuration of the interlocking lugs 18, $15^b$, 18ᵇ, 15, results in drawing the coupling members together in the longitudinal direction so that the gasket 20 shown as seated in a groove 21 of conduit member 10 is forced against the face of the gasket 20ᵇ of coupler B.

In order to preserve the interlocked engagement of the couplers coupling member 12 is provided with a key 22 slidably mounted in a guideway 23 formed in a projection 24 on the side of the coupling member back of lug 15, this key being adapted to be moved over the locking lug 18ᵇ of coupler B. Preferably the forward end 25 of key 22 is in the form of a wedge, the under or inclined surface 26 of which is adapted to bear against the upper inclined surface of lug 18ᵇ, lug 18ᵇ being wider and standing above lug 15, so that as the key 22 is driven forward it forces the lug 18ᵇ downwardly on lug 15 to tighten the interlock between the couplers. Key 22 is provided at its forward end with a stud 27 and the rear end of the key formed with a head 28 for the purpose of retaining the key in keyway 23.

The dotted lines in Fig. 3 indicate the angular position of the coupling member 12ᵇ of coupler B with respect to the parts of coupler A when the couplers are brought together for coupling but before the interlocking engagement between the coupling members has been effected.

When couplers, constructed as above described, are used on the rubber hoses commonly employed between the train pipes of the adjacent cars of a railway train, the coupling or uncoupling of the hoses may be accomplished very conveniently without any substantial bending of the hoses. This is an advantage inasmuch as the bending of the rubber hose connections on railway train pipes incident to the use of the commonly employed gravity couplers, shortens the life of the hoses considerably.

In Figs. 6, 7 and 8 we have shown a modified form of the invention. Fig. 6 shows two couplers C and D of identical construction. It will be sufficient to describe coupler C in detail. The corresponding parts of coupler D are given the same reference numerals distinguished by the exponent *d*. The conduit member 29 of coupler C is formed with diametrically arranged outstanding projections 30 which extend through slots 31 formed in the coupling member 32. The coupling member 32 is provided on one side with an undercut lug 33 and on the other side with a forwardly projecting wing or arm 34 provided at its outer end with a lug 35 formed with an undercut recess. Lug 35 interlocks with a lug 33ᵈ on coupler D. Lug 33 on coupler C is engaged by the locking lug 35ᵈ on the arm 34ᵈ of coupler D. 36 is a substantially U-shaped yoke, the ends of which are pivoted by means of a bolt 37 to ears 38 formed on the bottom of the coupling member 32, the bolt being held in place by studs 39, 39. The legs 40 of yoke 36 are preferably curved and engage the projections 30 on the conduit member. The top portion of the yoke is formed with a projecting pad 41 against which is adapted to bear a wedge 42 mounted to slide laterally of the coupling in projections 43, 44 on the top of the coupling member. Yoke 36 is formed opposite pad 41 with a stud 45 to center against the yoke a coiled spring 46 arranged in a spring pocket 47. Wedge 42 is formed with a retaining stud 48. By driving the wedge 42 in the direction of its smaller end, the yoke 36 is forced in a forward direction causing the conduit member 29 to be pressed against the conduit member 29ᵈ of the coupler D. The pressure exerted between the conduit members reacts upon the coupling members to tighten the interlocking engagement between said members.

The form of the invention shown in Figs. 6, 7 and 8 is not claimed specifically in this application, the specific features of this form of the invention being claimed in our co-pending application, Serial No. 716,602, filed May 29, 1924.

We claim:

1. In a hose coupling, the combination of a conduit member, a coupling member adapted to interlock with a mating coupler and movably arranged on said conduit member, and means movable longitdinally of the coupling member for tightening the engagement between the coupling member and the mating coupler and forcing the conduit member against the corresponding part of the other coupler.

2. In a hose coupling, the combination of a conduit member, a coupling member adapted to interlock with a mating coupler and movably arranged on said conduit member, and a wedge movable longitudinally of said coupling member and arranged to effect a relative movement as between said members which forces the conduit member against the corresponding part of the other coupler and tightens the interlocking engagement between the coupling member and the mating coupler.

3. In a hose coupler, the combination of a conduit member, a coupling member having an undercut lug adapted to interlock with a corresponding lug on the mating coupler, said coupling member being movably arranged on the conduit member, and a wedge movable longitudinally of the coupling member for tightening the engagement between the coupling member and the mating coupler and forcing the conduit member against a corresponding part of said mating coupler.

4. In a hose coupler, the combination of a conduit member, a coupling member provided with means for engaging a mating coupler and rotatable on the conduit member for making said engagement, and a slidable key for locking said coupling member in engagement with the mating coupler.

5. In a hose coupler, the combination of a conduit member and a coupling member provided with means movable thereon for engaging a mating coupler and for forcing the conduit member against said mating coupler, said coupling member being rotatable upon the conduit member to effect said engagement.

6. In a hose coupler, the combination of a conduit member, a coupling member provided with means for engaging a mating coupler and for forcing the conduit member against said mating coupler, said coupling member being rotatable upon the conduit member to effect said engagement, and a slidable key for locking the coupling member in engagement with the mating coupler.

7. In a hose coupler, the combination of a conduit member, a coupling member provided with means for engaging a mating coupler and rotatable on the conduit member for making said engagement, and a movable wedge to tighten said engagement.

8. In a hose coupler, the combination of a conduit member, a coupling member provided with means for engaging a mating coupler and for forcing the conduit member against said mating coupler, said coupling member being rotatable upon the conduit member to effect said engagement, and a movable wedge to tighten the engagement between said coupler and the mating coupler.

9. In a hose coupler, the combination of a conduit member, a coupling member rotatable on said conduit member and provided with a wedge formed lug adapted to interlock with a portion of the mating coupler on rotation of said coupling member, and a key slidable on said coupling member to bear upon said other coupler so as to preserve said engagement.

10. In a hose coupler, the combination of a conduit member, a coupling member rotatable on said conduit member and provided with a wedge-formed lug adapted to interlock with a portion of the mating coupler on rotation of said coupling member, and a wedge slidable on said coupling member and adapted to bear upon the other coupler to bring about a tightening of said interlocking engagement.

11. In a hose coupler, the combination of a conduit member, a coupling member rotatable on said conduit member and provided with a wedge-formed lug adapted to interlock with a corresponding lug on the mating coupler for effecting an engagement between said couplers, and a key slidable on said coupling member adapted to extend over said lug on the mating coupler and preserve said engagement.

12. In a hose coupler, the combination of a conduit member, a coupling member rotatable on said conduit member and provided with a wedge-formed lug adapted to interlock with a corresponding lug on the mating coupler for effecting an engagement between said couplers, and a wedge slidably arranged on said coupling member and adapted to exert wedging pressure against said lug on the mating coupler.

13. In a hose coupler, the combination of a conduit member, a coupling member rotatable on said conduit member and provided with a pair of wedge-formed lugs on opposite sides thereof adapted to interlock with a corresponding pair of lugs on the mating coupler, and a key slidably arranged on said coupling member and adapted to extend over the mating coupler to hold said couplers in interlocked engagement.

14. In a hose coupler, the combination of a conduit member, a coupling member rotatable on said conduit member and provided with a pair of wedge-formed lugs on opposite sides thereof adapted to interlock with a corresponding pair of lugs on the mating coupler, and a wedge slidably arranged on said coupling member and adapted to be driven against one of the lugs on the mating coupler to tighten the interlocking engagement between said couplers.

15. In a hose coupler, the combination of a conduit member, a coupling member rotatable on said conduit member and provided with an undercut lug adapted to engage a similarly formed lug on the mating coupler, and a wedge on said coupling member adapted to be driven in contact with the mating coupler to hold said couplers in their interlocked engagement.

16. In a hose coupler, the combination of a conduit member, a coupling member rotatable on said conduit member and provided with a pair of wedge-formed lugs on opposite sides thereof adapted to interlock with a corresponding pair of lugs on the mating coupler, a wedge slidably arranged on said coupling member and adapted to be driven against one of the lugs on the mating coupler to tighten the interlocking engagement between said couplers, and a pair of diametrically arranged, forwardly projecting centering lugs on said coupling member to overlap the mating coupler.

17. A hose coupling consisting of a pair of conduit members, coupling members rotatable on said conduit members, a pair of wedge-formed undercut lugs on each coupling member, one projecting outwardly and the other forwardly from the coupling member for interlocking with a mating coupler, and a slidable wedge on each of said coupling members adapted to bear upon the forwardly projecting lug of the other coupling member.

18. A coupling consisting of a pair of conduit members, coupling members rotatable on said conduit members, a pair of wedge-formed lugs on each of said conduit members adapted to interlock with the lugs on the other coupling member on rotation of said coupling members, and a wedge slidably arranged on each of said coupling members to bear upon one of the lugs of the other coupling member to force the interlocking lugs on said coupling members into closer engagement.

19. A hose coupling consisting of a pair of conduit members, coupling members rotatable on said conduit members, a pair of wedge-formed lugs on each of said conduit members adapted to interlock with the lugs on the other coupling member on rotation of said coupling members, and a wedge slidably arranged on each of said coupling members to bear upon one of the lugs of the other coupling member to force the interlocking lugs on said coupling members into closer engagement, said coupling members being formed with forwardly projecting centering lugs to overlap, in each case, the other coupler.

EGBERT H. GOLD.
EDWARD A. RUSSELL.